(12) United States Patent
Prasad et al.

(10) Patent No.: US 9,385,899 B2
(45) Date of Patent: Jul. 5, 2016

(54) CODEBOOK CONSTRUCTION

(71) Applicant: NEC Laboratories America, Inc., Princeton, NJ (US)

(72) Inventors: Narayan Prasad, Wyncote, PA (US); Guosen Yue, Plainsboro, NJ (US); Mohammad Khojastepour, Lawrenceville, NJ (US); Sampath Rangarajan, Bridgewater, NJ (US)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/204,838

(22) Filed: Mar. 11, 2014

(65) Prior Publication Data

US 2014/0241450 A1 Aug. 28, 2014

Related U.S. Application Data

(62) Division of application No. 14/198,653, filed on Mar. 6, 2014, now Pat. No. 9,020,061.

(60) Provisional application No. 61/774,275, filed on Mar. 7, 2013, provisional application No. 61/775,058, filed (Continued)

(51) Int. Cl.
*H04B 7/04* (2006.01)
*H04L 25/03* (2006.01)
(Continued)

(52) U.S. Cl.
CPC .......... *H04L 25/0391* (2013.01); *H04B 7/0456* (2013.01); *H04B 7/0469* (2013.01); *H04B 7/0478* (2013.01); *H04B 7/0486* (2013.01);
(Continued)

(58) Field of Classification Search
CPC .. H04B 7/0478; H04B 7/0469; H04B 7/0456; H04B 7/0639; H04B 7/0486; H04B 7/0452; H04L 1/06; H04L 25/0391
See application file for complete search history.

(56) References Cited

U.S. PATENT DOCUMENTS

| | | |
|---|---|---|
| 2008/0063115 A1 | 3/2008 | Varadarajan et al. |
| 2008/0232501 A1 | 9/2008 | Khojastepour et al. |

(Continued)

FOREIGN PATENT DOCUMENTS

| | | |
|---|---|---|
| EP | 2 557 700 A2 | 2/2013 |
| KR | 760998 | 9/2007 |

(Continued)

OTHER PUBLICATIONS

Ericsson,ST-Ericsson,"Design and Evaluation of 4 TX Precoder Codebooks for CSI Feedback," 3GPP TSG RAN WG1 R1-104847 62, Madrid, Aug. 2010.

(Continued)

*Primary Examiner* — Kenneth Lam
(74) *Attorney, Agent, or Firm* — Finnegan, Henderson, Farabow, Garrett & Dunner LLP

(57) ABSTRACT

A method implemented in a base station used in a wireless communications system is disclosed. The method comprises having 1-layer, 2-layer, 3-layer, and 4-layer codebooks for 4 transmit antenna (4TX) transmission, each codebook including a plurality of precoding matrices, precoding data with one of the plurality of precoding matrices, and transmitting, to a user equipment, the precoded data, wherein each of the 1-layer and 2-layer codebooks comprises a first codebook and a second codebook, and wherein each precoding matrix in the first codebook comprises a first index and a second index. Other apparatuses, systems, and methods also are disclosed.

11 Claims, 13 Drawing Sheets

Related U.S. Application Data on Mar. 8, 2013, provisional application No. 61/808,934, filed on Apr. 5, 2013, provisional application No. 61/817,150, filed on Apr. 29, 2013, provisional application No. 61/817,247, filed on Apr. 29, 2013, provisional application No. 61/821,989, filed on May 10, 2013.

(51) Int. Cl.
*H04B 7/06* (2006.01)
*H04L 1/06* (2006.01)

(52) U.S. Cl.
CPC .............. *H04B 7/065* (2013.01); *H04B 7/0626* (2013.01); *H04B 7/0641* (2013.01); *H04L 1/06* (2013.01)

(56) References Cited

U.S. PATENT DOCUMENTS

| | | | |
|---|---|---|---|
| 2008/0285667 A1* | 11/2008 | Mondal et al. ................ | 375/260 |
| 2009/0080549 A1* | 3/2009 | Khan et al. .................... | 375/260 |
| 2009/0274225 A1 | 11/2009 | Khojastepour et al. | |
| 2011/0255635 A1* | 10/2011 | Lee et al. ...................... | 375/295 |
| 2011/0305161 A1* | 12/2011 | Ekpenyong et al. .......... | 370/252 |
| 2012/0328039 A1 | 12/2012 | Mazzarese et al. | |
| 2013/0077660 A1* | 3/2013 | Ko et al. ....................... | 375/219 |
| 2013/0114654 A1* | 5/2013 | Gomadam .................... | 375/219 |
| 2013/0322361 A1* | 12/2013 | Ko et al. ....................... | 370/329 |
| 2014/0098689 A1* | 4/2014 | Lee et al. ...................... | 370/252 |
| 2014/0177545 A1* | 6/2014 | Nammi ......................... | 370/329 |
| 2014/0177744 A1* | 6/2014 | Krishnamurthy et al. .... | 375/267 |
| 2014/0177745 A1* | 6/2014 | Krishnamurthy et al. .... | 375/267 |
| 2014/0192918 A1* | 7/2014 | Park et al. ..................... | 375/267 |
| 2014/0301492 A1* | 10/2014 | Xin et al. ...................... | 375/267 |

FOREIGN PATENT DOCUMENTS

| | | |
|---|---|---|
| KR | 2011-0102169 | 9/2011 |
| WO | WO 2011/136600 A2 | 11/2011 |
| WO | 2012/039589 A2 | 3/2012 |

OTHER PUBLICATIONS

A. Forenza, D. Love and R. Heath,"Simplified Spatial Correlation Models for Clustered MIMO Channels With Different Array Configurations," IEEE Trans. Veh. Tech., Jul. 2007.

S. Loyka,"Channel capacity of MIMO architecture using the exponential correlation model," IEEE Commun. Letters, Sep. 2001.

D. Love, R. Heath and T. Strohmer,"Grassmannian beamforming for multiple-input multiple-output wireless systems," IEEE Trans. Int Theory, Oct. 2003.

3GPP TS 36.213 V10.8.0 (Dec. 2012), 3rd Generation Partnership Project; Technical Specification Group Radio Access Network; Evolved Universal Terrestrial Radio Access (E-UTRA); Physical layer procedures (Release 10), http://www.3gpp.org/.

NEC Group, "DL MU-MIMO Enhancement Schemes," 3GPP TSG RAN WG1 R1-130364, Jan. 2013.

NEC Group, "MU-MIMO: CQI Computation and PMI Selection," 3GPP TSG RAN WG1 R1-103832, Jun. 2010.

NEC Group, "DL MU-MIMO enhancement via Residual Error Norm feedback," 3GPP TSG RAN WG1 R1-113874, Nov. 2011.

NEC Group: "On the 4TX Codebook Enhancement", 3GPP Draft; R1-130845, 3rd Generation Partnership Project (3GPP), Mobile Competence Centre ; 650, Route Des Lucioles ; F-06921 Sophia-Antipolis Cedex ; France, vol. RAN WG1, no. St Julian; Jan. 28, 2013-Feb. 1, 2013 Mar. 9, 2013, XP050696680, URL:http://www.3gpp.org/ftp/tsg_ran/WG1_RL1/TSGR1_72/Docs/ *pp. 4-5*.

Samsung, "Performance evaluations of Rel. 10 4Tx feedback enhancement," 3GPP TSG-RAN WG1#62 R1-105049, Aug. 27, 2010 <URL:http://www.3gpp.org/ftp/tsg_ran/WG1_RL1/TSGR1_62/Docs/R1-105049.zip>.

Notification of Reason(s) for Rejection issued by the Japanese Patent Office on Jul. 28, 2015, in counterpart Japanese Patent Application No. 2015-504778.

Communication Pursuant to Article 94(3) EPC in counterpart EP Application No. 14 741 780.2 dated Apr. 25, 2016.

* cited by examiner

| Index | Gain vector |
|---|---|
| 0 | $\mathbf{g} = [1,1,1,1]/2$ |
| 1 | $\mathbf{g} = [\Gamma_1, \Gamma_2, \Gamma_2, \Gamma_1]$ |
| 2 | $\mathbf{g} = [\Gamma_2, \Gamma_1, \Gamma_1, \Gamma_2]$ |
| 3 | $\mathbf{g} = [\Gamma_2, \Gamma_2, \Gamma_1, \Gamma_1]$ |
| 4 | $\mathbf{g} = [\Gamma_1, \Gamma_1, \Gamma_2, \Gamma_2]$ |
| 5 | $\mathbf{g} = [\Gamma_1, \Gamma_2, \Gamma_1, \Gamma_2]$ |
| 6 | $\mathbf{g} = [\Gamma_2, \Gamma_1, \Gamma_2, \Gamma_1]$ |
| 7 | Re-use default codebook |

FIG. 2

| (s,i) | i=1 | i=2 |
|---|---|---|
| s=1 | 0 | 1 |
| s=2 | 2 | 3 |
| s=3 | 4 | 5 |
| s=4 | 6 | 7 |

FIG. 3

| [s,(m,p)] | (1,1) | (2,2) | (1,2) |
|---|---|---|---|
| s=1 | 1 | 11 | 1 |
| s=2 | 3 | 12 | 2 |
| s=3 | 14 | 14 | - |

FIG. 4A

| [s,(m,p)] | (1,1) | (2,2) | (1,2) |
|---|---|---|---|
| s=1 | 0 | 10 | 0 |
| s=2 | 2 | 11 | 1 |
| s=3 | 13 | 13 | - |

FIG. 4B

| [s,(m,p)] | (1,1) | (2,2) | (1,2) |
|---|---|---|---|
| s=1 | 0 | 0 | 0 |
| s=2 | 2 | 2 | 2 |
| s=3 | - | - | 4 |
| s=3 | - | - | 6 |

FIG. 5

| (s,i) | i=1 | i=2 | i=3 | i=4 |
|---|---|---|---|---|
| s=1 | 0 | 3 | 0 | 3 |
| s=2 | 1 | 4 | 1 | 4 |
| s=3 | 2 | 6 | 2 | 6 |
| s=4 | 4 | 7 | 4 | 7 |

FIG. 6A

| (s,i) | i=1 | i=2 | i=3 | i=4 |
|---|---|---|---|---|
| s=1 | 0 | 3 | 0 | 3 |
| s=2 | 1 | 4 | 1 | 4 |
| s=3 | 2 | 6 | 2 | 6 |
| s=4 | 5 | 7 | 5 | 7 |

FIG. 6B

| [s,(m,p)] | (1,1) | (2,2) | (3,3) | (4,4) | (1,2) | (1,4) | (2,3) | (2,4) |
|---|---|---|---|---|---|---|---|---|
| s=1 | 0 | 0 | 2 | 2 | 0 | 0 | 0 | 0 |
| s=2 | 1 | 1 | 8 | 8 | 6 | 6 | 6 | 6 |

FIG. 7

| [s,(m,p)] | (1,1) | (2,2) | (3,3) | (4,4) | (1,2) | (1,4) | (2,3) | (2,4) |
|---|---|---|---|---|---|---|---|---|
| s=1 | 2 | 2 | 2 | 2 | 0 | 0 | 0 | 0 |
| s=2 | 8 | 8 | 8 | 8 | 6 | 6 | 6 | 6 |

FIG. 8A

| [s,(m,p)] | (1,1) | (2,2) | (3,3) | (4,4) | (1,2) | (1,4) | (2,3) | (2,4) |
|---|---|---|---|---|---|---|---|---|
| s=1 | 1 | 1 | 1 | 1 | 0 | 0 | 0 | 0 |
| s=2 | 4 | 4 | 4 | 4 | 3 | 3 | 3 | 3 |

FIG. 8B

| [s,(m,p)] | (1,1) | (2,2) | (3,3) | (4,4) | (1,2) | (1,4) | (2,3) | (2,4) |
|---|---|---|---|---|---|---|---|---|
| s=1 | 0 | 0 | 0 | 2 | 0 | 0 | 0 | 0 |
| s=2 | 1 | 2 | 13 | 5 | 4 | 4 | 4 | 4 |

FIG. 9

| [s,(m,p)] | (1,1) | (2,2) | (3,3) | (4,4) | (1,2) | (1,4) | (2,3) | (2,4) |
|---|---|---|---|---|---|---|---|---|
| s=1 | 0 | 0 | 0 | 0 | 0 | 0 | 0 | 0 |
| s=2 | 4 | 4 | 4 | 4 | 4 | 4 | 4 | 4 |

FIG. 10

CODEBOOK CONSTRUCTION

This application is a divisional of co-pending U.S. patent application Ser. No. 14/198,653, entitled "Codebook Construction," filed Mar. 6, 2014, which in turn claims the benefit of U.S. Provisional Application No. 61/774,275, entitled "Observations on Codebook Construction," filed on Mar. 7, 2013, U.S. Provisional Application No. 61/775,058, entitled "Observations on Codebook Construction," filed on Mar. 8, 2013, U.S. Provisional Application No. 61/808,934, entitled "Enhancements to a Structured Codebook," filed on Apr. 5, 2013, U.S. Provisional Application No. 61/817,150, entitled "Enhancement to the 4 Transmit Antenna Precoding Codebook," filed on Apr. 29, 2013, U.S. Provisional Application No. 61/817,247, entitled "Enhancement to the 4 Transmit Antenna Precoding Codebook," filed on Apr. 29, 2013, U.S. Provisional Application No. 61/821,989, entitled "Improvements to the 4 Transmit Antenna Precoding Codebook," filed on May 10, 2013, the contents of all of which are incorporated herein by reference.

BACKGROUND OF THE INVENTION

The present invention relates to precoding matrix design and, more particularly, to precoding matrix design to derive a precoding matrix as a product of two matrices.

Wireless communication systems demand for even higher spectral efficiencies to accommodate the higher throughput requirements within the limited frequency bands. Multiple antenna or multiple-input and multiple-output (MIMO) systems and in particular closed loop transmission technologies such as beamforming and precoding have been vastly considered to improve the spectral efficiency. In MIMO precoding schemes, the data to be transmitted is divided into one or more streams, the streams are mapped onto one or more transmission layers, and the data in the layers are precoded with a precoder or precoding matrix before transmission. The number of transmission layers is called transmission rank. The transmission rank can be optimally chosen for a given channel realization by considering, for example, the transmit power and the overall channel statistics.

In codebook based precoding strategies, a predetermined codebook is made available to the transmitter, i.e., base station (BS), and all receivers, i.e., mobile stations (MSs) or user equipments (UEs). The receiver then chooses a precoder from the codebook which maximizes its performance (e.g. its data rate) and feeds back the precoder index. The selection of precoder rank may also be included in the precoder selection algorithm. The feedback rate may vary from a short-term feedback once every coherent time interval to a long-term feedback once every several coherent time intervals.

In many systems, the optimal precoders from the codebook for two adjacent transmission blocks are close with respect to a proper distance measure in the set of all possible precoders. Here, the adjacent blocks may be considered in time or in frequency, e.g., over the set of tones in orthogonal frequency-division multiplexing (OFDM) systems since in practical systems the channel does not change abruptly from one transmission block to the adjacent one. Thus, the precoder used in those blocks can be equal if the channel is pretty steady and the codebook resolution is not too high. By increasing the codebook resolution or having a more dynamic channel, the precoders of the adjacent blocks are not equal anymore, yet, they might be close. The closeness between two precoders can be measured based on a proper distance metric in the space of all such precoders. Some examples of differential, dual and multi-resolution codebooks are disclosed in refs. [5] and [6].

We consider precoding codebook design for the 4 transmit antenna (TX) MIMO downlink channel and detail a codebook structure that is suitable for both the uniform linear array (ULA) and the cross-pole antenna configurations, in order to obtain a codebook that is efficient, i.e., has a low feedback overhead and is easy to store and search over, and effective over both uniform linear array (ULA) and the cross-pole configurations. Some have proposed codebook designs for specific antenna configurations [7]. The fundamental properties of the spatial correlation matrices that we use have not been exploited in the prior art. The codebook structure herein is derived using fundamental properties of the spatial correlation matrices under the ULA and cross-pole antenna configurations. Each precoding codeword is derived as the product of two matrices which makes them efficient and achieves lower feedback overhead for a given performance level and better performance for a given feedback overhead.

REFERENCES

[1] Ericsson, S T—Ericsson, "Design and Evaluation of 4 TX Precoder Codebooks for CSI Feedback," 3*GPP TSG RAN WG*1 *R*1-104847 62, Madrid, August 2010.

[2] A. Forenza, D. Love and R. Heath, "Simplified Spatial Correlation Models for Clustered MIMO Channels With Different Array Configurations," *IEEE Trans. Veh. Tech.*, July 2007.

[3] S. Loyka, "Channel capacity of MIMO architecture using the exponential correlation model," *IEEE Commun. Letters*, 2001.

[4] D. Love, R. Heath and T. Strohmer, "Grassmannian beamforming for multiple-input multiple-output wireless systems," *IEEE Trans. Inf. Theory*, October 2003.

[5] M. A. Khojastepour et al., "STATIC AND DIFFERENTIAL PRECODING CODEBOOK FOR MIMO SYSTEMS," U.S. Patent Application Publication US 2008/0232501 A1.

[6] M. A. Khojastepour et al., "MULTI-RESOLUTION PRECODING CODEBOOK," U.S. Patent Application Publication US 2009/0274225 A1.

[7] 3GPP TS 36.213 V10.8.0 (2012-12), 3rd Generation Partnership Project; Technical Specification Group Radio Access Network; Evolved Universal Terrestrial Radio Access (E-UTRA); Physical layer procedures (Release 10), http://www.3gpp.org/.

[8] NEC Group, "DL MU-MIMO Enhancement Schemes," 3*GPP TSG RAN WG*1 *R*1-130364.

[9] NEC Group, "MU-MIMO: CQI Computation and PMI Selection," 3*GPP TSG RAN WG*1 *R*1-103832.

[10] NEC Group, "DL MU-MIMO enhancement via Residual Error Norm feedback," 3*GPP TSG RAN WG*1 *R*1-113874.

BRIEF SUMMARY OF THE INVENTION

An objective of the present invention is to provide a codebook of efficient precoding codewords which require lower feedback overhead for a given performance level and achieve better performance for a given feedback overhead.

An aspect of the present invention includes a method implemented in a base station used in a wireless communications system. The method comprises having 1-layer, 2-layer, 3-layer, and 4-layer codebooks for 4 transmit antenna (4TX) transmission, each codebook including a plurality of precoding matrices, precoding data with one of the plurality of precoding matrices, and transmitting, to a user equipment, the precoded data, wherein each of the 1-layer and 2 layer codebooks comprises a first codebook and a second codebook, and wherein each precoding matrix in the first codebook comprises a first index and a second index.

Another aspect of the present invention includes a method implemented in a user equipment used in a wireless communications system. The method comprises receiving, from a base station, precoded data, wherein each of 1-layer, 2-layer, 3-layer, and 4-layer codebooks for 4 transmit antenna (4TX) transmission includes a plurality of precoding matrices, wherein each of the 1-layer and 2-layer codebooks comprises a first codebook and a second codebook, and wherein each precoding matrix in the first codebook comprises a first index and a second index.

Still another aspect of the present invention includes a base station used in a wireless communications system. The base station comprises a transmitter to transmit, to a user equipment, precoded data, wherein each of 1-layer, 2-layer, 3-layer, and 4-layer codebooks for 4 transmit antenna (4TX) transmission includes a plurality of precoding matrices, wherein each of the 1-layer and 2 layer codebooks comprises a first codebook and a second codebook, and wherein each precoding matrix in the first codebook comprises a first index and a second index.

Still another aspect of the present invention includes a user equipment used in a wireless communications system. The user equipment comprises a receiver to receive, from a base station, precoded data, wherein each of 1-layer, 2-layer, 3-layer, and 4-layer codebooks for 4 transmit antenna (4TX) transmission includes a plurality of precoding matrices, wherein each of the 1-layer and 2 layer codebooks comprises a first codebook and a second codebook, and wherein each precoding matrix in the first codebook comprises a first index and a second index.

Still another aspect of the present invention includes a wireless communications system comprising a base station having 1-layer, 2-layer, 3-layer, and 4-layer codebooks for 4 transmit antenna (4TX) transmission, each codebook including a plurality of precoding matrices and precoding data with one of the plurality of precoding matrices, a user equipment receiving, from the base station, the precoded data, wherein each of the 1-layer and 2 layer codebooks comprises a first codebook and a second codebook, and wherein each precoding matrix in the first codebook comprises a first index and a second index.

Still another aspect of the present invention includes a method implemented in a wireless communications system. The method comprises precoding data; and transmitting, from a base station to a user equipment, the precoded data, wherein each of 1-layer, 2-layer, 3-layer, and 4-layer codebooks for 4 transmit antenna (4TX) transmission includes a plurality of precoding matrices, wherein each of the 1-layer and 2 layer codebooks comprises a first codebook and a second codebook, and wherein each precoding matrix in the first codebook comprises a first index and a second index.

The first index may be for a plurality of subbands and the second index may be for each subband.

The second codebook may comprise a legacy codebook or a householder codebook.

Each of the 3-layer and 4-layer codebooks may comprise a legacy codebook or a householder codebook.

Each precoding matrix W in the first codebook may satisfy $W=W^{(1)}W^{(2)}$, where first matrix $W^{(1)}$ is chosen from inner codebook $\mathcal{C}^{(1)}$, and second matrix $W^{(2)}$ is chosen from an outer codebook.

Still another aspect of the present invention includes a method implemented in a base station used in a wireless communications system. The method comprises having a codebook including a plurality of precoding matrices, precoding data with one of the plurality of precoding matrices, and transmitting, to a user equipment, the precoded data, wherein each precoding matrix W satisfies $W=W^{(1)}W^{(2)}$, where first matrix $W^{(1)}$ is chosen from first codebook $\mathcal{C}^{(1)}$, and second matrix $W^{(2)}$ is chosen from a second codebook.

Still another aspect of the present invention includes a method implemented in a user equipment used in a wireless communications system. The method comprises receiving, from a base station, data precoded with one of a plurality of precoding matrices, wherein a codebook includes the plurality of precoding matrices, and wherein each precoding matrix W satisfies $W=W^{(1)}W^{(2)}$, where first matrix $W^{(1)}$ is chosen from first codebook $\mathcal{C}^{(1)}$, and second matrix $W^{(2)}$ is chosen from a second codebook.

Still another aspect of the present invention includes a base station used in a wireless communications system. The base station comprises a transmitter to transmit, to a user equipment, data precoded with one of a plurality of precoding matrices, wherein a codebook including the plurality of precoding matrices, and wherein each precoding matrix W satisfies $W=W^{(1)}W^{(2)}$, where first matrix $W^{(1)}$ is chosen from first codebook $\mathcal{C}^{(1)}$, and second matrix $W^{(2)}$ is chosen from a second codebook.

Still another aspect of the present invention includes a user equipment used in a wireless communications system. The user equipment comprises a receiver to receive, from a base station, data precoded with one of a plurality of precoding matrices, wherein a codebook includes the plurality of precoding matrices, and wherein each precoding matrix W satisfies $W=W^{(1)}W^{(2)}$, where first matrix $W^{(1)}$ is chosen from first codebook $\mathcal{C}^{(1)}$, and second matrix $W^{(2)}$ is chosen from a second codebook.

Still another aspect of the present invention includes a wireless communications system comprising a base station having a codebook including a plurality of precoding matrices and precoding data with one of the plurality of precoding matrices, and a user equipment receiving, from the base station, the precoded data, wherein each precoding matrix W satisfies $W=W^{(1)}W^{(2)}$, where first matrix $W^{(1)}$ is chosen from first codebook $\mathcal{C}^{(1)}$, and second matrix $W^{(2)}$ is chosen from a second codebook.

Still another aspect of the present invention includes a method implemented in a wireless communications system. The method comprises precoding data with one of the plurality of precoding matrices, and transmitting, from a base station to a user equipment, the precoded data, wherein a codebook includes the plurality of precoding matrices, and wherein each precoding matrix W satisfies $W=W^{(1)}W^{(2)}$, where first matrix $W^{(1)}$ is chosen from first codebook $\mathcal{C}^{(1)}$, and second matrix $W^{(2)}$ is chosen from a second codebook.

BRIEF DESCRIPTION OF THE DRAWINGS

FIG. 2 depicts a 3 bit codebook of gain vectors referring to $g=[a_1, a_2, a_3, a_4]$ as the gain vector.

FIG. 3 depicts co-phasing terms in 8-PSK alphabet for Rank-1.

FIG. 4A depicts co-phasing terms in 16-PSK alphabet for Rank-2.

FIG. 4B depicts other co-phasing terms in 16-PSK alphabet for Rank-2.

FIG. 5 depicts co-phasing terms in 8-PSK alphabet for Rank-2.

FIG. 6A depicts co-phasing terms in 8-PSK alphabet for Rank-1.

FIG. 6B depicts other co-phasing terms in 8-PSK alphabet for Rank-1.

FIG. 7 depicts co-phasing terms in 24-PSK alphabet for Rank-2.

FIG. 8A depicts co-phasing terms in 24-PSK alphabet for Rank-2.

FIG. 8B depicts co-phasing terms in 12-PSK alphabet for Rank-2.

FIG. 9 depicts co-phasing terms in 16-PSK alphabet for Rank-2.

FIG. 10 depicts co-phasing terms in 16-PSK alphabet for Rank-2.

DETAILED DESCRIPTION

Figure 1:
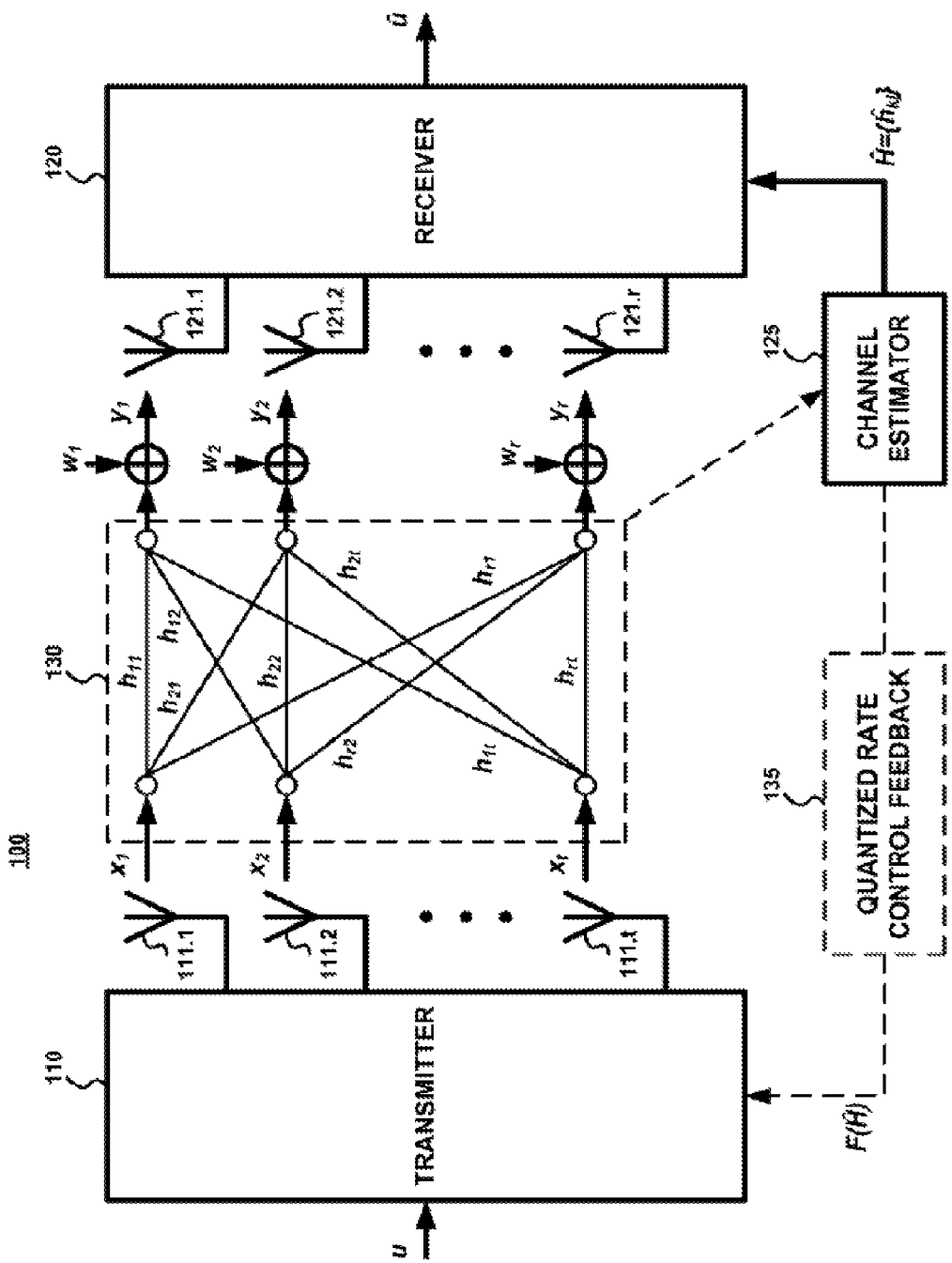
FIG. 1 depicts a downlink multiuser MIMO system with $N_T$ transmit-antennas at the transmitter and $N_R$ receive antennas at the receiver.

FIG. 1 shows a downlink multiuser MIMO system with $N_T$ transmit-antennas at the BS and $N_R$ receive antennas at the UE. Multiple-antenna communication system 100 with a multi-level precoding codebook is schematically shown in FIG. 1. Transmitter 110 transmits from t transmitting antennas 111.1-111.t over fading channel 130 to r receiving antennas 121.1-121.r coupled to receiver 120. Channel estimator 125 provides an estimate of channel 130 to receiver 120. The channel estimate is also quantized and provided to transmitter 110 via quantized rate control feedback channel 135.

In systems that employ beamforming such as the MIMO systems, the beamforming matrix (referred to also as a precoding matrix, a precoder, a codeword, or a precoding codeword) generated in response to perceived channel conditions is computed and quantized at the receiver first, and then is provided to the source transmitter (e.g., via feedback). A conventional approach to reduce the overhead associated with this feedback is to provide matrix codebook(s) at each of the transmitter and the receiver, each of the codebook(s) comprising a plurality, or set, of potential beamforming matrices that may be used depending on the channel conditions perceived at the receiver. When the receiver has identified the appropriate matrix codebook(s), the receiver will feed back one or more indices (instead of the actual matrix entries) that points to the appropriate codeword in the codebook(s) stored at the transmitter.

I. Example 1

1 Uniform Linear Array

In the following unless otherwise mentioned we may assume the co-polarized antennas to be closely spaced.

We have the following observations for the uniform linear array (ULA) transmit antenna configuration. Consider a system with N co-polarized transmit antennas and let C denote the transmit spatial correlation matrix. Let us define J to be the matrix which has zeros everywhere except on the cross diagonal elements, i.e., $J=[J_{m,n}]$ where $$J_{m,n} = \begin{cases} 1, & n = N - m + 1 \\ 0, & \text{otherwise} \end{cases} \quad (1)$$

A vector is said to be Hermitian if $$\bar{x}=Jx, \quad (2)$$

where $\bar{x}$ denotes the conjugate of x. We offer the following set of properties. The first observation is regarding the spatial correlation matrix of the ULA transmit antenna configuration and holds true with wide generality (cf. [2]).

Observation 1

The matrix C is a Hermitian Toeplitz matrix, i.e., C satisfies $$\bar{C}=JCJ \quad (3)$$

where $\bar{C}$ denotes the conjugate of C.

Lemma 1

The eigenspace of any Hermitian Toeplitz matrix can be completely described by Hermitian vectors. In other words, given a Hermitian Toeplitz matrix A and with x being its eigenvector such that $Ax=\lambda x$, then $\exists$ y such that $\bar{y}=Jy$ with $$Ay=\lambda y \quad (4)$$

Lemma 2

Suppose $\lambda$ is an eigenvalue of a Hermitian Toeplitz matrix A with algebraic multiplicity one. Then if x is an eigenvector such that $Ax=\lambda x$, we must have $$Jx=\exp(j\delta)\bar{x}. \quad (5)$$

for some $\delta \in [0,2\pi)$ and where $j=\sqrt{-1}$.

A simplified model for the correlation matrix is the exponential correlation model [3], which is discussed further in the Appendix, and is given by $$C=[C_{m,n}]_{m,n=1}^N, C_{m,n}=\rho^{|m-n|}\exp(j\theta(m-n)), m,n \in \{1,\ldots,N\}, \quad (6)$$

where $\rho \in [0,1]$ & $\theta \in [0,2\pi)$.

2.1 4 TX ULA

In this section, we consider the case of N=4 co-polarized transmit antennas. First, note that without loss of generality, we can impose the following structure on each eigenvector x of the spatial correlation matrix C, $$x=[a_1,a_2\exp(j\theta_2),a_3\exp(j\theta_3),a_4\exp(j\theta_4)]^T, \quad (7)$$

where $a_1, a_2, a_3, a_4 \in IR_+$. Recalling that the matrix C must be a Hermitian Toeplitz matrix and invoking Lemmas 1 and 2, we can deduce that we must have $$a_1=a_4, a_2=a_3$$

$$\theta_2+\theta_3=\theta_4. \quad (8)$$

Then, consider any two eigen-vectors of the form in (8) given by $$x=[a,b\exp(j\theta_2),b\exp(j\theta_3),a\exp(j(\theta_2+\theta_3))]^T \quad (9)$$

$$y=[c,d\exp(j\gamma_2),d\exp(j\gamma_3),c\exp(j(\gamma_2+\gamma_3))]^T, \quad (10)$$

where a, b, c, d $\in IR_+$. Then, a sufficient condition to enforce orthogonality among these two eigenvectors is to ensure that $$\theta_2+\theta_3=\pm\pi+\gamma_2+\gamma_3$$

$$\theta_2-\theta_3=\pm\pi+\gamma_2-\gamma_3$$

which can be simplified to $$\theta_2=t\pi+\gamma_2, t\in\{0,\pm1\}$$

$$\theta_3=\pm(1-|t|)\pi+\gamma_3. \quad (11)$$

We remark that (11) is not necessary but works for all possible values of the scalars a, b, c, d$\in IR_+$.

2 Polarized Setup

Suppose the transmitter has 2N cross-polarized antennas comprising of a pair of N co-polarized antennas each. Then the correlation matrix of each one of these two co-polarized sets is denoted by C which is Hermitian and Toeplitz. The overall 2N×2N correlation matrix $\tilde{C}$ can be written as $$\tilde{C} = \begin{bmatrix} 1 & \alpha \\ \bar{\alpha} & 1 \end{bmatrix} \otimes C \quad (12)$$

where $\otimes$ denotes the kronecker product and $\alpha \in \mathbb{C} : |\alpha| \in [0,1]$. It can be shown that any eigenvector $\tilde{y}$ of $\tilde{C}$ has the form $$\tilde{y} = y \otimes x \quad (13)$$

where $y \in \mathbb{C}^{2 \times 1}$ is an eigenvector of the matrix $$\begin{bmatrix} 1 & \alpha \\ \bar{\alpha} & 1 \end{bmatrix}$$

and x is an eigenvector of C. Furthermore, the two eigenvectors of the matrix $$\begin{bmatrix} 1 & \alpha \\ \bar{\alpha} & 1 \end{bmatrix}$$

are $$\frac{\exp(j\beta)}{\sqrt{2}}$$

$$\begin{bmatrix} 1 & \frac{\alpha}{|\alpha|} \end{bmatrix}^T$$

and $$\frac{\exp(j\beta)}{\sqrt{2}} \begin{bmatrix} 1 & -\frac{\alpha}{|\alpha|} \end{bmatrix}^T,$$

where $(.)^T$ denotes the transpose operation and the phase term $\exp(j\beta)$ can be ignored without loss of optimality. The two eigen-values are $1 \pm |\alpha|$. Note that the matrix $$\begin{bmatrix} 1 & \alpha \\ \bar{\alpha} & 1 \end{bmatrix}$$

also models the correlation matrix of the 2 transmit ULA.

3 Codebook Construction

We now proceed to specify a codebook using the observations developed in Sections 1 and 2. In particular, we specify a subset of the codebook which is suitable for closely spaced 4TX ULA and cross-pole antenna configurations as well as other configurations. We first consider the rank-1 codebook which comprises of a set of 4×1 vectors. Without loss of generality, we first consider a generic structure $x = [a_1, a_2\exp(j\theta_2), a_3\exp(j\theta_3), a_4\exp(j\theta_4)]^T$, where $a_1, a_2, a_3, a_4 \in \mathbb{R}_+$. We will define three component codebooks out of which the rank-1 codebook is formed. The first one, referred to as the gain vector codebook and denoted by $\mathcal{G}$, is one from which the gains $\{a_j\}_{j=1}^4$ are drawn. The other two are codebooks to quantize the phase terms $\{\exp(j\theta_j)\}_{j=2}^4$ and are denoted by $\mathcal{P}_2$ and $\mathcal{P}_3$. Let us consider the gain vector codebook $\mathcal{G}$. To cover the closely spaced 4TX ULA we need enough vectors in the rank-1 codebook that have a structure of the form in (8). We refer to $g = [a_1, a_2, a_3, a_4]$ as the gain vector and provide a 3 bit codebook of gain vectors in FIG. 2, where $$\Gamma_1 = \sqrt{\frac{\psi}{2(1+\psi)}},$$

$$\Gamma_2 = \sqrt{\frac{1}{2(1+\psi)}}$$

for some configurable scalar $\psi > 0$. Note that the gain vectors corresponding to indices 0, 1, 2 follow the constraint in (8) and hence are suitable to the 4 TX closely spaced ULA case. The gain vector corresponding to index 0 is suitable to the 4 TX cross-pole case, whereas the ones corresponding to indices 3,4 address a scenario referred to here as the power imbalance case (cf. Appendix 8). The index 7 indicates re-use of an existing default codebook while indices 5,6 are included to simply offer more choices.

Next, to quantize the phases we introduce two phase codebooks, $\mathcal{P}_2$ and $\mathcal{P}_3$. We enforce the restriction in (8) that $\theta_4 = \theta_2 + \theta_3$ so that the vector x can be expanded as $$x = \begin{bmatrix} a_1 \\ \exp(j\theta_2)a_2 \\ \exp(j\theta_3)a_3 \\ \exp(j\theta_3)\exp(j\theta_2)a_4 \end{bmatrix} \quad (14)$$

We use the codebook $\mathcal{P}_2$ to select $\theta_2$ and the codebook $\mathcal{P}_3$ to select $\theta_3$. A simple way to construct these two codebooks is via uniform quantization of $[0,2\pi)$ using the given number of bits for each codebook. Notice that with this choice of selecting the phases, if we choose the gain vector corresponding to the index 0 in gain vector codebook of FIG. 2, we see that the resulting vector conforms to the structure of the generic eigen-vector of the correlation matrix of the 4TX cross-pole. Similarly, upon choosing the gain vector corresponding to any one of the indices 0, 1, 2 in the gain vector codebook, we see that the resulting vector conforms to the structure of the generic eigen-vector of the correlation matrix of the 4TX ULA.

We now consider the rank-2 codebook which comprises of a set of semi-unitary 4×2 matrices. From the observations made in Section 1 we can define a subset of such matrices having the structure $$X = \begin{bmatrix} a_1 & a_{1'} \\ \exp(j\theta_2)a_2 & \exp(j\theta_2)a_{2'} \\ \exp(j\theta_3)a_2 & \exp(j(\theta_3+\pi))a_{2'} \\ \exp(j(\theta_3+\theta_2))a_1 & \exp(j(\theta_3+\theta_2+\pi))a_{1'} \end{bmatrix}$$

$$= \begin{bmatrix} a_1 & a_{1'} \\ \exp(j\theta_2)a_2 & \exp(j\theta_2)a_{2'} \\ \exp(j\theta_3)a_2 & -\exp(j\theta_3)a_{2'} \\ \exp(j(\theta_3+\theta_2))a_1 & -\exp(j(\theta_3+\theta_2))s_{1'} \end{bmatrix}$$

Note that this structure is complaint with the 4TX ULA (cf. Section 1) and also with the structure of the first two dominant eigenvectors of the 4TX ULA configuration with the exponential correlation model (as discussed in Section 6) and when $a_1 = a_{1'} = a_2 = a_{2'}$, it is also suitable for the 4TX cross-pole configuration (as discussed in Section 2). In addition, we can include matrices having the structure $$X = \begin{bmatrix} a_1 & a_{1'} \\ \exp(j\theta_2)a_2 & \exp(j(\theta_2+\pi))a_{2'} \\ \exp(j\theta_3)a_2 & \exp(j\theta_3)a_{2'} \\ \exp(j(\theta_3+\theta_2))a_1 & \exp(j(\theta_3+\theta_2+\pi))a_{1'} \end{bmatrix}$$
$$= \begin{bmatrix} a_1 & a_{1'} \\ \exp(j\theta_2)a_2 & -\exp(j\theta_2)a_{2'} \\ \exp(j\theta_3)a_2 & \exp(j\theta_3)a_{2'} \\ \exp(j(\theta_3+\theta_2))a_1 & -\exp(j(\theta_3+\theta_2))a_{1'} \end{bmatrix}$$

which are complaint with the 4TX ULA.

4 Codebook Construction in Product Form

We next discuss two codebook constructions, based on the principles outlined in Sections 1 and 2, in which each codeword is derived as a matrix product. In each case, we use the codebook designed in [1] as the base and expand it while conforming to the principles outlined in Sections 1 and 2.

Let $w_n = [1\ \exp(j2\pi n/16)]^T$ for $n = 0, \ldots, 15$. We refer to this codebook as the first embodiment and define its inner (wideband) codebook as $$C^{(1)} = \left\{ \begin{bmatrix} A(q) \odot W^{(1)}(k) & 0 \\ 0 & B(q) \odot W^{(1)}(k) \end{bmatrix} : W^{(1)}(k) = [ \right. \tag{15}$$

$$w_{2k\ mod 16}, w_{2k+1\ mod 16}, w_{2k+2\ mod 16}, w_{2k+3\ mod 16}],$$

$$\left. k = 0, \ldots, 7; q = 1, \ldots, Q \right\},$$

where $\odot$ denotes Hadamard product and $$A(q) = \begin{bmatrix} 1 & 0 \\ 0 & \exp(j2\pi\ d_q) \end{bmatrix} \begin{bmatrix} a_q & a_q & b_q & b_q \\ b_q & b_q & a_q & a_q \end{bmatrix} \tag{16}$$

$$B(q) = \exp(j2\pi\gamma_q) \begin{bmatrix} 1 & 0 \\ 0 & \exp(j2\pi\ d_q) \end{bmatrix} \begin{bmatrix} b_q & b_q & a_q & a_q \\ a_q & a_q & b_q & b_q \end{bmatrix},$$

$$q = 1, \ldots, Q,$$

where $\gamma_q, a_q, b_q, d_q \in [0,1]$ & $a_q^2 + b_q^2 = 1/2 \forall q$. The rank-1 outer codebook is defined as $$C_1^{(2)} = \left\{ \begin{bmatrix} y \\ y \end{bmatrix}, \begin{bmatrix} y \\ -y \end{bmatrix}, \begin{bmatrix} y \\ jy \end{bmatrix}, \begin{bmatrix} y \\ -jy \end{bmatrix} \right\} \tag{17}$$

$$y = \{e_1, e_2, e_3, e_4\}, \tag{18}$$

where $e_i$ denotes the 4×1 column selection vector. The outer rank-2 codebook is defined as $$C_2^{(2)} = \left\{ \begin{bmatrix} y_1 & y_2 \\ y_1 & -y_2 \end{bmatrix}, \begin{bmatrix} y_1 & y_2 \\ jy_1 & -jy_2 \end{bmatrix} \right\}, \tag{19}$$

$$(y_1 y_2) = \{(e_1, e_1), (e_2, e_2), (e_3, e_3), \tag{20}$$
$$(e_4, e_4), (e_1, e_3), (e_1, e_4), (e_2, e_3), (e_2, e_4)\},$$

We note that one choice of the scalars $a_q$, $b_q$ is $$a_q = \sqrt{\frac{\psi_q}{2(1+\psi_q)}}, \quad b_q = \sqrt{\frac{1}{2(1+\psi_q)}}$$

for some configurable scalars $\psi_q > 0$.

In each feedback interval to select the rank-2 codewords, one for each subband, we first select one common matrix from the inner (wideband) codebook $C^{(1)}$, say $\tilde{W}^{(1)}$. Then, on each subband n, a matrix from the outer (subband) rank-2 codebook $C_2^{(2)}$, say $\tilde{W}_{2,n}^{(2)}$, is selected and the final precoder selection for that subband is obtained as $\tilde{W}^{(1)} \tilde{W}^{(2)}$ For convenience, we let $C_2^f(\tilde{W}^{(1)})$ denote the (final) codebook corresponding to rank-2, which contains all possible such final precoder selections given the choice of inner precoder $\tilde{W}^{(1)}$. Similar procedure and notation is adopted for the other ranks and other choices of the inner precoder $\tilde{W}^{(1)}$.

We note that one choice of $\gamma_q$, $d_q$ is to set $d_q = \gamma_q/2 = \theta_q$ for some configurable scalars $\{\theta_q \in [0,1]\}$. Under this choice, we next describe a way of determining a set of triplets $\{\theta_q, a_q, b_q\}_{q=1}^Q$. From the discussion in Appendix 7 using the exponential correlation model, we relate $$\exp(j2\pi\theta) = \frac{\bar{a}}{|a|}$$

so that a good choice is to assume that the (un-quantized) $\theta$ is uniformly distributed in $[0,1)$. Thus, a good strategy to obtain a finite set $\Theta = \{\theta\}$ is via uniform quantization of $[0,1)$ using the given number of bits. An example can be $\Theta = \{0, \frac{1}{4}, \frac{1}{2}, \frac{3}{4}\}$ for 2 bits.

Considering the selection of $a_q$, $b_q$, one possibility is to relate them to the variables p, q discussed in Appendix 7. Accordingly, a finite set of values for the correlation magnitude parameter $\rho = |a|$ can be selected from which a set of vectors $S = \{[p,q]\}$ can be obtained. For example, we can assume the set $\{\frac{1}{2}, \frac{2}{3}, \frac{3}{4}, 1\}$ for correlation magnitude parameter $\rho = |a|$. Then, invoking the formulas in Appendix 7 we obtain that the set of vectors $S$ is equal to $\{[0.4352, 0.5573], [0.4571, 0.5395], [0.4680, 0.5301], [0.5000, 0.5000]\}$. Then the set of triplets $\{\theta_q, a_q, b_q\}$ can be defined as the Cartesian product $\Theta \otimes S$, where we have used $\otimes$ to denote the Cartesian product. For instance, using the particular instances of $S$ and $\Theta$ given above we see that the Cartesian product $\Theta \otimes S$ of size 16 or equivalently 4 bits. Another example could be to obtain a Cartesian product of size 15 by using $\Theta = \{0, \frac{1}{5}, \frac{2}{5}, \frac{3}{5}, \frac{4}{5}\}$ and the set $S = \{[0.4571, 0.5395], [0.4680, 0.5301], [0.5000, 0.5000]\}$ using only three values $\{\frac{2}{3}, \frac{3}{4}, 1\}$ for correlation magnitude parameter. Another example is one where the Cartesian product is of size 16 and is obtained by using $\Theta = \{0, \frac{1}{8}, \frac{2}{8}, \ldots, \frac{7}{8}\}$ and the set $S = \{[0.4680, 0.5301], [0.5000, 0.5000]\}$ using only two values $\{\frac{3}{4}, 1\}$ for the correlation magnitude parameter.

We now consider another alternate codebook, henceforth referred to as the second embodiment, whose codewords are also derived in the product form. We now define the inner wideband codebook to be $$C^{(1)} = \left\{ \begin{bmatrix} A(q)w_n & 0 \\ 0 & B(q)w_n \end{bmatrix} : n = 0, \ldots, 15; q = 1, \ldots, Q \right\}, \tag{21A}$$

where $$A(q) = \begin{bmatrix} a_q & 0 \\ 0 & b_q \end{bmatrix}$$

$$B(q) = \begin{bmatrix} b_q & 0 \\ 0 & a_q \end{bmatrix}, q = 1, \ldots, Q,$$

or

-continued $$A(q) = \begin{bmatrix} 1 & 0 \\ 0 & \exp(j2\pi d_q) \end{bmatrix} \begin{bmatrix} a_q & 0 \\ 0 & b_q \end{bmatrix} \quad (21B)$$

$$B(q) = \exp(j2\pi\gamma_q) \begin{bmatrix} 1 & 0 \\ 0 & \exp(j2\pi d_q) \end{bmatrix} \begin{bmatrix} b_q & 0 \\ 0 & a_q \end{bmatrix},$$

$$q = 1, \ldots, Q.$$

The rank-1 outer codebook is defined as $$C_1^{(2)} = \left\{ \begin{bmatrix} 1 \\ 1 \end{bmatrix}, \begin{bmatrix} 1 \\ -1 \end{bmatrix}, \begin{bmatrix} 1 \\ j \end{bmatrix}, \begin{bmatrix} 1 \\ -j \end{bmatrix} \right\} \quad (22)$$

and the rank-2 outer codebook is defined as $$C_2^{(2)} = \left\{ \begin{bmatrix} 1 & 1 \\ 1 & -1 \end{bmatrix}, \begin{bmatrix} 1 & 1 \\ j & -j \end{bmatrix} \right\}. \quad (23)$$

In either case the rank-3 and rank-4 codebooks can be fixed to the legacy (Householder) rank-3 and rank-4 codebooks. In addition, the entire legacy codebook can be included as a subset.

Note that the first embodiment has a desirable property which is missing in the second one. This property is that for each rank k, for each choice of inner precoder $\tilde{W}^{(1)}$, assuming that each precoder matrix in the codebook $C_k^f(\tilde{W}^{(1)})$ corresponding to that rank can be selected equi-probably, the expected value of each row norm square (i.e., sum of the magnitude squares of elements in that row) of the selected precoder matrix is identical. This property is beneficial for operating (i.e., controlling the backoff of) the power amplifiers and utilizing the available transmit power.

4.1 Embedding in a Larger Codebook

Note that the channel matrix realization depends on both the spatial correlation matrix as well as the short-term (a.k.a. fast) fading. In some scenarios there can be significant variations in the observed channel matrix on account of fast-fading, such as the case where the co-polarized antennas are widely spaced. Thus, a good codebook needs to accommodate such significant variations in the observed channel matrix on account of fast-fading as well, which makes it necessary to include codewords that are designed using other criteria such as minimum chordal distance [4]. A useful way to address such cases would be to embed the codebook obtained using the aforementioned principles as a subset in a larger codebook.

5 Conclusions

We detailed a codebook structure and presented two embodiments which conform to the matrix product form. This structure is motivated by fundamental properties of the spatial correlation matrix and makes codebook optimization feasible.

6 Appendix

4 TX ULA with the Exponential Correlation Model

Next, we consider the case where we further specialize the correlation matrix to be $$C = \begin{bmatrix} 1 & a & a^2 & a^3 \\ b & 1 & a & a^2 \\ b^2 & b & 1 & a \\ b^3 & b^2 & b & 1 \end{bmatrix}, \quad (24)$$

where $a \in \mathbb{C}$ such that $|a| \leq 1$ and $b = \bar{a}$. Note that the matrix C is Hermitian Toeplitz and is also completely characterized by one complex scalar. Thus its eigenvectors can be expected to have more structure in addition to that possessed by an eigenvector of a general Hermitian Toeplitz matrix. We will also exploit this additional structure in the following. The matrix J for this case can be written as, $$J = \begin{bmatrix} 0 & 0 & 0 & 1 \\ 0 & 0 & 1 & 0 \\ 0 & 1 & 0 & 0 \\ 1 & 0 & 0 & 0 \end{bmatrix}$$

We first consider the case $|a| < 1$. In this case, the eigenvectors of any matrix of the form in (24) have the following properties. Consider any matrix C of the form in (24) and let $$C = E\Lambda E^\dagger \quad (25)$$

denote its eigen-decomposition where $(.)^\dagger$ denotes the conjugate transpose operation and $\Lambda = \text{diag}\{\lambda_1, \lambda_2, \lambda_3, \lambda_4\}$ with $\lambda_1 \leq \lambda_2 \leq \lambda_3 \leq \lambda_4$ denoting the four real-valued eigenvalues. Then, $$E = D_p(H \odot S) \quad (26)$$

where $\odot$ denotes the Hadamard product and $D_p$ is a diagonal matrix of the form $$D_p = \text{diag}\{1, \exp(j\gamma), \exp(2j\gamma), \exp(3j\gamma)\} \quad (27)$$

for some $\gamma \in [0, 2\pi)$. The matrix S has the following structure $$S = \begin{bmatrix} p & r & q & s \\ q & s & p & r \\ q & s & p & r \\ p & r & q & s \end{bmatrix} \quad (28)$$

for some real positive scalars p, q, r, s such that $q = \sqrt{\frac{1}{2} - p^2}$ and $r = \sqrt{\frac{1}{2} - s^2}$. The matrix H is a 4×4 real-valued Hadamard matrix, i.e., columns of H are mutually orthogonal and all its elements belong to the set $\{\pm 1\}$. Then, since each column of E must satisfy the condition in (5), each column of $H = [h_1, \ldots, h_4]$ must satisfy the following conditions.

$$h_{1i}h_{4i} = h_{2i}h_{3i}, \forall i = 1,2,3,4. \quad (29)$$

Also, since E must be a unitary matrix, H must also satisfy the following additional conditions.

$$h_{11}h_{12} = -h_{41}h_{42}, h_{21}h_{22} = -h_{31}h_{32}; h_{11}h_{14} = -h_{41}h_{44},$$
$$h_{21}h_{24} = -h_{31}h_{34}$$

$$h_{22}h_{23} = -h_{32}h_{33}, h_{12}h_{13} = -h_{42}h_{43};$$

An important example H is the following:

$$H = \begin{bmatrix} 1 & 1 & -1 & 1 \\ 1 & 1 & 1 & -1 \\ 1 & -1 & 1 & 1 \\ 1 & -1 & -1 & -1 \end{bmatrix}$$

Using H given above and recalling that $\rho = |a|$, we can derive formulas that yield the scalars p, q, r, s as follows. First we have that $$\exp(j\gamma) = \frac{\bar{a}}{|a|}.$$

Substituting this in (26) yields after some manipulations that $$q = \frac{\rho(1+\rho)}{\sqrt{2[\rho^2(1+\rho)^2 + (\vartheta - \rho)^2]}}, \quad (30)$$

-continued where $\vartheta = \dfrac{\rho + \rho^3 + \sqrt{\rho^2(1+\rho^2)^2 + 4\rho^2(1+2\rho)}}{2}$ and $p = \sqrt{1/2 - q^2}$.

Note that in the special case when $\rho=0$ the correlation matrix C reduces to the identity matrix so that we can chose p, q, r, s arbitrarily (subject to the respective norm constraints). Further, for $\rho<1$, we can determine that $r = \sqrt{\dfrac{\zeta + \rho}{2(2\zeta + \rho + \rho^3)}}$ with $s = \sqrt{1/2 - r^2}$ where $\zeta = \dfrac{-\rho - \rho^3 + \sqrt{(\rho - \rho^3)^2 + 4\rho^2(1-\rho)^2}}{2}$.

On the other hand when $\rho=1$ we note that the matrix C is a rank-1 matrix that is given by $$C = \begin{bmatrix} 1 \\ b \\ b^2 \\ b^3 \end{bmatrix} \begin{bmatrix} 1 & a & a^2 & a^3 \end{bmatrix}. \quad (31)$$

It can be then shown that the eigen-vector of C corresponding to its one non-zero eigenvalue is of the form $$\dfrac{[1, \exp(j\gamma), \exp(2j\gamma), \exp(3j\gamma)]^T}{2} \quad (32)$$

where $\exp(j\gamma) = \dfrac{\overline{a}}{|a|}$ so that $p=q=\frac{1}{2}$. The choice of r, s can be arbitrary (subject to the norm constraint) since the associated eigen-value is zero.

7 Appendix

Accommodating Power Imbalance

A more general model for the spatial correlation of the cross-pole antenna configuration is the following. Consider a transmitter with 2N cross-polarized antennas comprising of a pair of N co-polarized antennas each. Then the correlation matrix of each one of these two co-polarized sets is denoted by C which is Hermitian and Toeplitz. The overall $2N \times 2N$ correlation matrix $\tilde{C}$ can be written as $$\tilde{C} = \begin{bmatrix} 1 & \alpha \\ \overline{\alpha} & \beta \end{bmatrix} \otimes C \quad (33)$$

where $\beta > 0$ and $\alpha \in \mathbb{C}: |\alpha| \in [0,1]$ such that $\beta > |\alpha|^2$. It can be shown that any eigenvector $\tilde{y}$ of $\tilde{C}$ has the form $\tilde{y} = y \otimes x \quad (34)$ where $y \in \mathbb{C}^{2 \times 1}$ is an eigenvector of the matrix $$\begin{bmatrix} 1 & \alpha \\ \overline{\alpha} & \beta \end{bmatrix}$$

and x is an eigenvector of C. Notice that the matrix $$\begin{bmatrix} 1 & \alpha \\ \overline{\alpha} & \beta \end{bmatrix}$$

can represent any 2×2 positive semi-definite matrix up-to a scaling factor. Consequently, the 2×2 unitary matrix formed by its two eigenvectors can be any 2×2 unitary matrix. Then, to design codebooks suitable for such scenarios we consider the first embodiment presented in Section 4 and expand its outer codebook $\mathcal{C}^{(2)}$ as follows.

The rank-1 outer codebook is now defined as $$C_1^{(2)} = \left\{ \begin{bmatrix} \delta_{q'} y \\ \sqrt{1 - \delta_{q'}^2}\, y \end{bmatrix}, \begin{bmatrix} \delta_{q'} y \\ -\sqrt{1 - \delta_{q'}^2}\, y \end{bmatrix}, \begin{bmatrix} \delta_{q'} y \\ j\sqrt{1 - \delta_{q'}^2}\, y \end{bmatrix}, \begin{bmatrix} \delta_{q'} y \\ -j\sqrt{1 - \delta_{q'}^2}\, y \end{bmatrix} \right\} \quad (35)$$

$y = \{e_1, e_2, e_3, e_4\}, \quad (36)$ where $\delta_{q'} \in [0,1]$: $q'=1, \ldots, Q'$ are pre-determined scalars for some $Q' \leq 1$. The outer rank-2 codebook is now defined as $$C_2^{(2)} = \left\{ \begin{bmatrix} \delta_{q'} y_1 & \sqrt{1-\delta_{q'}^2}\, y_2 \\ \sqrt{1-\delta_{q'}^2}\, y_1 & -\delta_{q'} y_2 \end{bmatrix}, \begin{bmatrix} \delta_{q'} y_1 & \sqrt{1-\delta_{q'}^2}\, y_2 \\ j\sqrt{1-\delta_{q'}^2}\, y_1 & -j\delta_{q'} y_2 \end{bmatrix} \right\}, \quad (37)$$

$(y_1, y_2) = \left\{ \begin{array}{l} (e_1, e_1), (e_2, e_2), (e_3, e_3), (e_4, e_4), \\ (e_1, e_3), (e_1, e_4), (e_2, e_3), (e_2, e_4) \end{array} \right\} \quad (38)$ Similarly, for the second embodiment the rank-1 outer codebook is defined as $$C_1^{(2)} = \left\{ \begin{bmatrix} \delta_{q'} \\ \sqrt{1-\delta_{q'}^2} \end{bmatrix}, \begin{bmatrix} \delta_{q'} \\ -\sqrt{1-\delta_{q'}^2} \end{bmatrix}, \begin{bmatrix} \delta_{q'} \\ j\sqrt{1-\delta_{q'}^2} \end{bmatrix}, \begin{bmatrix} \delta_{q'} \\ -j\sqrt{1-\delta_{q'}^2} \end{bmatrix} \right\} \quad (39)$$

and the rank-2 outer codebook is defined as $$C_2^{(2)} = \left\{ \begin{bmatrix} \delta_{q'} & \sqrt{1-\delta_{q'}^2} \\ \sqrt{1-\delta_{q'}^2} & -\delta_{q'} \end{bmatrix}, \begin{bmatrix} \delta_{q'} & \sqrt{1-\delta_{q'}^2} \\ j\sqrt{1-\delta_{q'}^2} & -j\delta_{q'} \end{bmatrix} \right\}. \quad (40)$$

We remark here that the codebooks defined above are also suitable for the case where the transmitter has 4 geographically separated co-polarized antennas comprising of a pair of 2 co-polarized antennas at each location. Then the correlation matrix of each one of these two co-polarized sets is given by C which is Hermitian and Toeplitz. The overall 4×4 correlation matrix $\tilde{C}$ can be written as $$\tilde{C} = \begin{bmatrix} d_1 & 0 \\ 0 & d_2 \end{bmatrix} \otimes C \quad (41)$$

where $\otimes$ denotes the kronecker product and $d_1, d_2 \in [0,1]$ are the normalized gain terms reflecting the different average propagation path gains from the two locations.

II. Example 2

Codebook Construction in Product Form

We now discuss a structured codebook construction, based on the principles we derived above, in which each codeword is derived as a matrix product.

Let $w_n = [1 \, \exp(j2\pi n/N)]^T$ for $n=0, \ldots, N-1$. We define the inner (wideband) codebook as follows. First we define $$W^{(1)}(k) = [w_{kK}, \ldots, w_{kK+J-1}], k=0, \ldots, L-1, \quad (2-1)$$

for some positive integers K, J, L where K is referred to as the step, J is referred to as the width and L is referred to as the extent. These parameters are chosen to typically satisfy $(L-1)K \leq N \leq LK$ and $K \leq J$. Now we detail the inner (wideband) codebook as $$C^{(1)} = \left\{ \begin{array}{l} D(q2)W^{(1)}(k, q1) = D(q2) \\ \begin{bmatrix} A(q1) \odot W^{(1)}(k) & 0 \\ 0 & B(q1) \odot W^{(1)}(k) \end{bmatrix}: \\ k=0, \ldots, L-1; q1=1, \ldots, Q1; q2=1, \ldots, Q2 \end{array} \right\}, \quad (2-2)$$

where $\odot$ denotes Hadamard product and $D(q2) = \text{diag}\{1,1, \exp(j2\pi\gamma_{q2}), \exp(j2\pi\gamma_{q2})\}$, i.e., $D(q2)$ is a diagonal matrix whose main diagonal contains the vector $[1,1, \exp(j2\pi\gamma_{q2}), \exp(j2\pi\gamma_{q2})]$, where $j=\sqrt{-1}$ and $$A(q1) = \begin{bmatrix} 1 & 0 \\ 0 & \exp(j2\pi d_{q1}) \end{bmatrix} \begin{bmatrix} a_{q1}^1 & a_{q1}^2 & \ldots & a_{q1}^J \\ b_{q1}^1 & b_{q1}^2 & \ldots & b_{q1}^J \end{bmatrix} \quad (2-3)$$

$$B(q1) = \begin{bmatrix} 1 & 0 \\ 0 & \exp(j2\pi d_{q1}) \end{bmatrix} \begin{bmatrix} b_{q1}^1 & b_{q1}^2 & \ldots & b_{q1}^J \\ a_{q1}^1 & a_{q1}^2 & \ldots & a_{q1}^J \end{bmatrix},$$

$$q1 = 1, \ldots, Q1,$$

where $a_{q1}^m, b_{q1}^m, d_{q1}, \gamma_{q2} \in [0,1]$ & $(a_{q1}^m)^2 + (b_{q1}^m)^2 = \frac{1}{2} \forall m, q1$.

Note that for a given q2, q1 and when $a_{q1}^m = b_{q1}^m = \frac{1}{2} \forall m$, we can introduce an overlap among $\{W^{(1)}(k, q1)\}$ for consecutive choices of k. In particular, by ensuring that $(k+1)K \leq kK+J-1$ we see that some columns in $W^{(1)}(k, q1)$ are identical to those in $W^{(1)}(k+1, q1)$. This is a useful feature to have in the inner wideband codebook since correlation in time or frequency changes gradually. However this need not hold when for some m $a_{q1}^m \neq \frac{1}{2}$. To introduce such overlap among different inner codewords in such a case, we can first ensure $(k+1)K \leq kK+J-1$ and then select $\{a_{q1}^m, a_{q1'}^m\}$ appropriately for some q1, q1'$\in\{1, \ldots, Q1\}$ (recall that choosing $a_{q1}^m$ ($a_{q1'}^m$) also fixes $b_{q1}^m$ ($b_{q1'}^m$)) to ensure that columns of $W^{(1)}(k, q1)$ and $W^{(1)}(k+1, q1')$ have an overlap.

The rank-1 outer codebook is defined as $$C_1^{(2)} = \left\{ W^{(2,1)}(r, s) = \begin{bmatrix} e_r \\ e_s \end{bmatrix}, \begin{bmatrix} e_r \\ -e_s \end{bmatrix}, \begin{bmatrix} e_r \\ je_s \end{bmatrix}, \begin{bmatrix} e_r \\ -je_s \end{bmatrix} \right\} \quad (2-4)$$

$$r, s = \{1, \ldots, J\},$$

where we mean that $W^{(2,1)}(r, s)$ for a given r, s can be any one of four indicated vectors, where $e_i$ denotes the J×1 column selection vector selecting the $i^{th}$ column in the J×J identity matrix. To limit the size only certain combinations of (r, s) referred to here as feasible combinations might be allowed, where we note that r=s can be a feasible combination. For any subband, a rank-1 final codeword is formed by selecting an inner codeword $D(q2)W^{(1)}(k, q1)$ from $C^{(1)}$ along with an outer codeword $W^{(2,1)}(r, s)$ from $C_1^{(2)}$ to obtain the final codeword for that subband as $D(q2)W^{(1)}(k, q1)W^{(2,1)}(r, s)$. Note that the choice of the inner codeword may be common across all subbands.

Next, to expand the selection possibilities in each subband, we can move D(q2) to the outer codebook. In other words, we can define the inner wideband codebook as $\tilde{C}^{(1)} = \{W^{(1)}(k, q1)\}$ with an outer subband rank-1 codebook as $$\tilde{C}_1^{(2)} = \left\{ W^{(2,1)}(r, s, q2) = \begin{bmatrix} e_r \\ \exp(j2\pi\gamma_{q2})e_s \end{bmatrix}, \right. \quad (2-5)$$

$$\left. \begin{bmatrix} e_r \\ -\exp(j2\pi\gamma_{q2})e_s \end{bmatrix}, \begin{bmatrix} e_r \\ j\exp(j2\pi\gamma_{q2})e_s \end{bmatrix}, \begin{bmatrix} e_r \\ -j\exp(j2\pi\gamma_{q2})e_s \end{bmatrix} \right\}$$

$$r, s = \{1, \ldots, J\}, q2 \in \{1 \ldots, Q2\}$$

for some feasible combinations (r, s, q2). In all the aforementioned cases, the outer codebook can be made dependent on the choice of the inner codeword. In other words the feasible combinations (r, s) in (2-4) or (r, s, q2) in (2-5) can themselves be functions, respectively, of the choice of the inner codeword. Put differently, two different inner codewords can have different feasible combinations to select codewords from the outer codebook. In each case, the set of feasible combinations for each choice of the inner codeword is pre-determined and known to all users and the base-stations.

Let us now consider the rank-2 case. The first possibility is to keep the inner codebook defined in (2-2) together with the following outer subband rank-2 codebook that is invariant to the choice of the inner codeword, $$C_2^{(2)} = \left\{ W^{(2,2)}(r, s) = \begin{bmatrix} e_r & e_s \\ e_r & -e_s \end{bmatrix}, \begin{bmatrix} e_r & e_s \\ je_r & -je_s \end{bmatrix} \right\}, \quad (2-6)$$

$$r, s = \{1, \ldots, J\}$$

To limit the size only certain combinations of (r, s) might be allowed. Note that since the set of allowed combinations are common across all choices of the inner codeword, we must have that for each allowed (r, s) the columns of $D(q2)W^{(1)}(k, q1)W^{(2,2)}(r, s)$ are mutually orthogonal for each choice of inner codeword. We note that r=s is one such choice which ensures orthogonality for each choice of inner codeword $D(q2)W^{(1)}(k, q1)$.

To expand the set possible final rank-2 codewords without excessive overhead, we can make the allowed combinations dependent on the choice of the inner codeword. In particular we can define an outer subband codebook that is dependent on the choice of the inner codeword $D(q2)W^{(1)}(k, q1)$ (identified by indices q1, q2, k) that contains codewords denoted by $W^{(2,2)}(r, s, k, q1, q2)$ of the form $$\left\{ \begin{bmatrix} e_r & e_s \\ e_r & -e_s \end{bmatrix}, \begin{bmatrix} e_r & e_s \\ je_r & -je_s \end{bmatrix}, \begin{bmatrix} e_r & e_s \\ e_s & -\exp(j\theta(r,s,k,q1,q2))e_r \end{bmatrix}, \right. \quad (2\text{-}7)$$
$$\left. \begin{bmatrix} e_r & e_s \\ je_s & -j\exp(j\theta(r,s,k,q1,q2))e_r \end{bmatrix} \right\},$$

where r, s ∈ {1, . . . , J}. The phase θ(r, s, k, q1, q2) together with the allowed combinations (r, s) must ensure that the two columns of the resulting final codeword $D(q2)W^{(1)}(k, q1)W^{(2,2)}(r, s, k, q1, q2)$ are orthogonal. Notice that due to the structure of our inner codebook, it is sufficient for this phase term to be a function of only r, s & q1 so that we can write the phase term as θ(r, s, q1). To allow more choices in the outer codebook, as done in the rank-1 case we can move D(q2) to the outer codebook. In other words, we can define the inner wideband codebook as $\tilde{C}^{(1)} = \{W^{(1)}(k, q1)\}$ with an outer subband rank-2 codebook that has codewords of the form $$\left\{ \begin{bmatrix} e_r & e_s \\ \exp(j2\pi\gamma_{q2})e_r & -\exp(j2\pi\gamma_{q2})e_s \end{bmatrix}, \right.$$
$$\begin{bmatrix} e_r & e_s \\ \exp(j2\pi\gamma_{q2})e_s & -\exp(j2\pi\gamma_{q2})\exp(j\theta(r,s,k,q1,q2))e_r \end{bmatrix}$$
$$\begin{bmatrix} e_r & e_s \\ j\exp(j2\pi\gamma_{q2})e_r & -j\exp(j2\pi\gamma_{q2})e_s \end{bmatrix},$$
$$\left. \begin{bmatrix} e_r & e_s \\ j\exp(j2\pi\gamma_{q2})e_s & -j\exp(j2\pi\gamma_{q2})\exp(j\theta(r,s,k,q1,q2))e_r \end{bmatrix} \right\}$$

where r, s ∈ {1, . . . , J}, q2 ∈ {1 . . . , Q2} for some feasible combinations (r, s, q2).

To further expand the set of rank-2 codewords we can ensure orthogonality among columns of the resulting final codeword in other ways. Suppose that the inner codebook is defined as in (2-2) (we skip the case where the inner codebook is defined as $\tilde{C}^{(1)} = \{W^{(1)}(k, q1)\}$ and D(q2) is moved to the outer codebook since the steps given can be applied after straightforward changes). We then suppose that the rank-2 outer codebook is dependent on the choice of the inner codeword and includes codewords of the form in (2-7). In addition, for a choice of the inner codeword $D(q2)W^{(1)}(k, q1)$, we can also have codewords of the form $$[e(r,s)(D(q2)W^{(1)}(k,q1))^+ \mathcal{P}(D(q2)W^{(1)}(k,q1)e(r,s))], \quad (2\text{-}8)$$

where $e(r, s) = [e_r^T, e_s^T]^T$ and $(D(q2)W^{(1)}(k, q1))^+$ is the pseudo-inverse of $D(q2)W^{(1)}(k, q1)$ satisfying $D(q2)W^{(1)}(k, q1)(D(q2)W^{(1)}(k, q1))^+ = I$. $\mathcal{P}(.)$ is an pre-defined operator such that for any unit-norm vector x, $\mathcal{P}(x)$ is a unit norm vector in the sub-space $I - xx^\dagger$. Preferably such an operator may have the property that if the vector x possesses the constant magnitude property, which is that all its elements have the same magnitude, then even $\mathcal{P}(x)$ has that property. An example of such an operator is HH(x,t), which for t ∈ {2, 3, 4} and any unit norm vector x whose first element is real and strictly less than one, yields the $t^{th}$ column of the 4×4 unitary matrix obtained via the Householder transformation $$I - \frac{2(x-e_1)(x-e_1)^\dagger}{\|x-e_1\|^2}.$$

Note here that for our constructions, $x = D(q2)W^{(1)}(k, q1)e(r, s)$ satisfies the two conditions needed to define the Householder transformation. Also, if the vector x possesses the constant magnitude property then even HH(x, t) has that property.

Another example of such an operator is to set $\mathcal{P}(x) = D(x)Px$, where P is a permutation matrix and D(x) is a diagonal matrix whose diagonal entries depend on x such that $x^\dagger D(x)Px = 0$. Note that when x has the constant magnitude property then it is possible to construct a diagonal matrix D(x) whose non-zero entries have unit magnitude and ensure that $x^\dagger D(x)Px = 0$ as well as constant magnitude property for the vector D(x)Px.

Note that we can define a different set of inner codewords (i.e., inner codebook) for rank-1 and rank-2 and other ranks albeit where all of them have the generic structure in (2-2). Thus, rank specific inner codebooks can be defined. Recall that the per-subband outer codebook can already be a function of the inner codeword. We also note that in the codebooks described above, de-duplication may be done if needed. In particular, for any rank r, if there exists any two inner codewords that result in an equivalent set of final per-subband rank-r codewords, then only one among those two inner codewords must be retained in the inner codebook for that rank-r. Here we note that two final codewords are equivalent if one is identical to the other up-to column permutation and/or right multiplication by a matrix which is diagonal and all its non-zero entries have unit magnitude.

Notice that having a larger rank-2 inner codebook compared to rank-1 codebook can be beneficial for MU-MIMO. A larger inner codebook allows for better quantization resolution without increasing the feedback too much since only one inner codeword needs to be reported for all subbands. A better resolution for the higher rank-2 not only benefits SU-MIMO but also MU-MIMO since typically the user under MU-MIMO transmission will be served using a rank lower than what it reported. In this case a better resolution will ensure that the column subsets extracted from the user's reported precoders are also effective, i.e., have enough accuracy and thus allow for MU-MIMO gains.

III. Example 3

In Release 11 (Rel-11) LTE cellular network it is possible for the network to semi-statically configure multiple CSI processes for the same user. Each Rel-12 and beyond user is required to support both the legacy 4 TX codebook, as well as the enhanced 4 TX codebook. As implied above, these two codebooks can be viewed as two subsets (components) of a larger codebook. Moreover a separate codebook subset restriction can be applied for each CSI process. A useful corollary from these two observations is that the network may be allowed to configure the codebook separately for each CSI process (for a user of interest) in a semi-static manner, i.e., for each CSI process of a given user, the network can configure the component (i.e. legacy or enhanced) codebook that the user can use. In addition, further codebook subset restriction can also be applied on a per-CSI process basis given the choice of component codebooks for those processes. In order to reduce the signaling overhead, we propose to apply only one latter codebook subset restriction per CSI-process. Consequently, even if the CSI process (or equivalently the mode defined for that CSI process) requires the user to report per-subband precoding matrices (i.e., PMIs), all such reported matrices must respect the configured (common) subset restriction for that process.

Codebook Construction in Product Form

We first present a generic codebook construction in which each codeword is derived as a matrix product. For convenience, we ignore the normalization factor of ½. Letting $w_n = [1 \; \exp(j2\pi n/N)]^T$ for $n = 0, \ldots, N-1$ denote the $2 \times 1$ beam vector, we define the inner (wideband) codebook as $$C^{(1)} = \left\{ \begin{bmatrix} A(q)W^{(1)}(k) & 0 \\ 0 & A(q)W^{(1)}(k) \end{bmatrix} : W^{(1)}(k) = [ \right. \quad (3\text{-}1)$$

$$w_{a_k \bmod N}, w_{(a_k+1) \bmod N}, \ldots, w_{(a_k+J-1) \bmod N}],$$

$$\left. k = 0, \ldots, L-1; q = 1, \ldots, Q \right\},$$

where $\{a_k\}$ are real valued scalars and $$A(q) = \begin{bmatrix} 1 & 0 \\ 0 & \exp(j2\pi \, d_q) \end{bmatrix},$$

$$q = 1, \ldots, Q,$$

where $d_q \in [0,1] \forall q$. Note that the (angular) separation between the phase terms in any two adjacent beam vectors within a particular inner codeword $A(q)W^{(1)}(k)$ is $2\pi/N$ so that N and J together determine the angular span of the phase terms in each inner codeword. Intuitively, a larger angular span would allow us to make the codebook suitable even for less correlated fading scenarios. On the other hand, the scalars $\{d_q\}$ help control the separation between the phase terms in any two beam vectors that belong with two inner codewords $A(q)W^{(1)}(k)$ and $A(q')W^{(1)}(k)$ for some $q, q' \in \{1, \ldots, Q\}$. Intuitively, a small such separation would be beneficial for exploiting correlation in time and frequency.

The rank-1 outer (subband) codebook is then defined as $$C_1^{(2)} = \left\{ \begin{bmatrix} e_i \\ \exp(j\theta_{s,i})e_i \end{bmatrix} \right\},$$

$$s = 1, \ldots, S,$$

$$i = 1, \ldots, J$$

where $e_i$ denotes the $i^{th}$ $j \times 1$ column selection vector (i.e., the $i^{th}$ column of the $J \times J$ identity matrix) and $\exp(j\theta_{s,i})$ is a co-phasing term. The (maximum) size of the Rank-1 codebook is thus JS. A smaller size can be obtained by selecting only a subset of all possible such vectors. The co-phasing terms can be obtained by optimizing a suitable metric such as the average Chordal distance after restricting them to lie in an M-PSK alphabet where the positive integer M≥1 is a design parameter. The optimization can be constrained to ensure that a minimum angular separation is maintained between the co-phasing terms. For rank-2, the outer (subband) codebook is defined as $$C_2^{(2)} = \left\{ \begin{bmatrix} e_m & e_p \\ \exp(j\theta_{s,m,p})e_m & -\exp(j\theta_{s,m,p})e_p \end{bmatrix} \right\}.$$

Note that for different pairs (m, p) and (m', p') we can have different number of co-phasing terms. The co-phasing terms can be obtained by optimizing a suitable metric such as the average Chordal distance after restricting them to lie in an M'-PSK alphabet where the positive integer M'≥1 is a design parameter and can be different from M. The optimization can be constrained to ensure that a minimum angular separation is maintained between the co-phasing terms.

Figure 3:
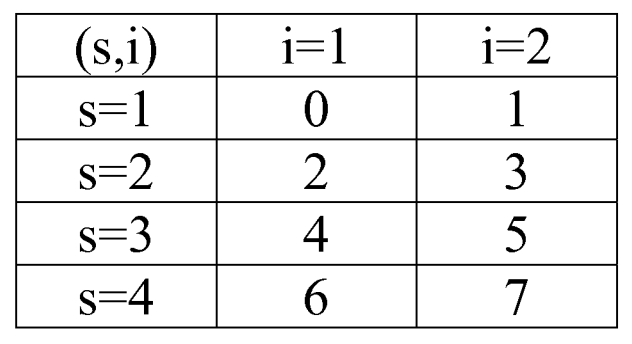
Figure 4A:
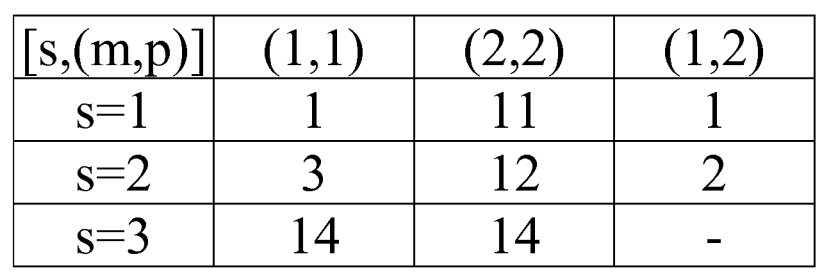
Figure 4B:
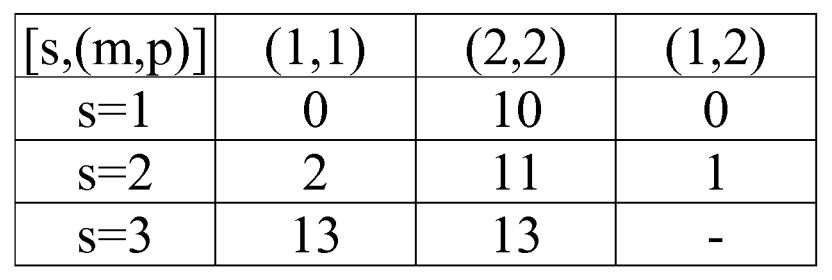
Figure 5:
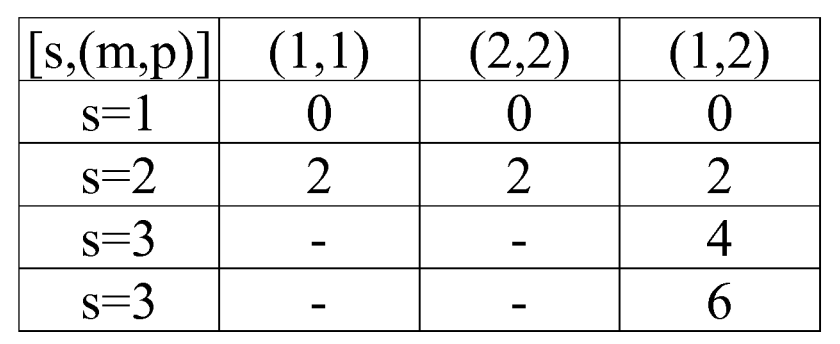

We next propose two specific embodiments. Both embodiments have a 4 bit wideband codebook. For the first embodiment we construct $C^{(1)}$ using N=L=8, J=2, $a_k$=k, k=0, ..., 7 and $d_q \in \{0, \frac{1}{16}\}$, so that each inner codeword is a 4×4 matrix. The corresponding sub-band codebook is of size 3-bits for both ranks 1 and 2. The co-phasing terms in the rank-1 codebook lie in the 8-PSK alphabet and are given in FIG. 3. Note that the notation adopted in the table in FIG. 3 is that when the entry corresponding to some (s, i) is t then $\theta_{s,i} = 2\pi t/M$ where M=8 for 8-PSK. For the rank-2 codebook we choose (m,p)∈{(1,1), (2,2), (1,2)} along with the co-phasing terms given in FIG. 4A or FIG. 4B. Alternatively, the co-phasing terms can be chosen as in FIG. 5. Note that we use more co-phasing options in FIG. 5 for the beam combination (1,2).

Figure 6A:
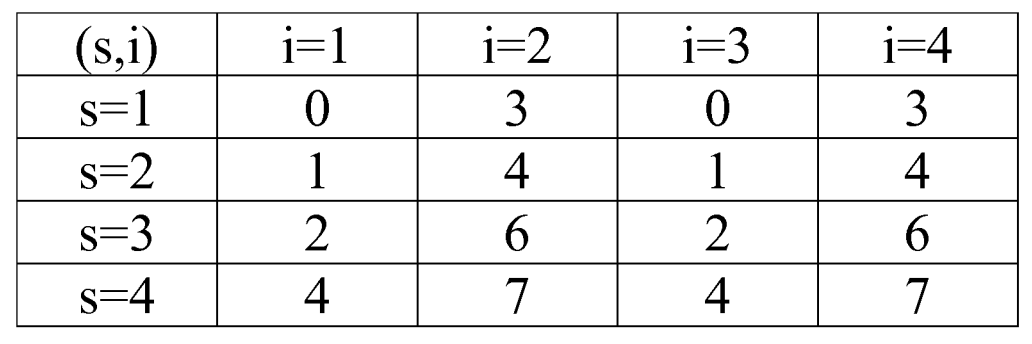
Figure 6B:
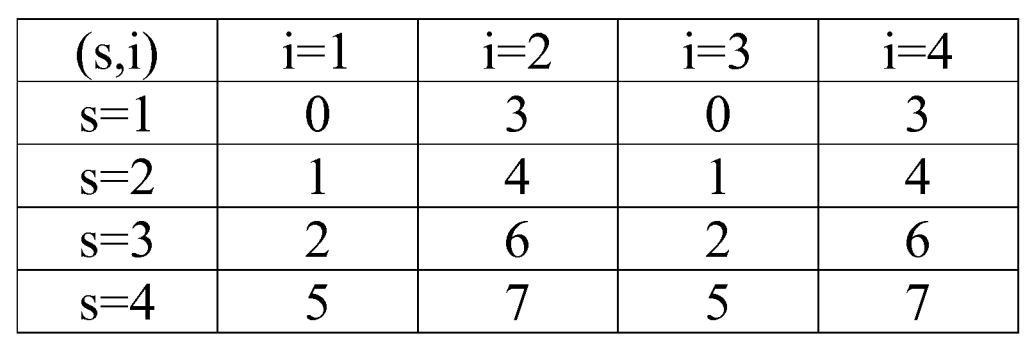

For the second embodiment we construct $C^{(1)}$ using N=16, L=8, J=4, $a_k$=2k, k=0, ..., 7 and $d_q \in \{0, \frac{1}{32}\}$, so that each inner codeword is a 4×8 matrix. The corresponding sub-band codebook is of size 4-bits for both ranks 1 and 2. The co-phasing terms in the rank-1 codebook lie in the 8-PSK alphabet and are given in FIG. 6A or FIG. 6B. For the rank-2 codebook we choose (m, p)∈{(1,1), (2,2), (3,3), (4,4), (1,2), (1,4), (2,3), (2,4)} along with the co-phasing terms given in FIG. 7. Alternatively we can also choose the co-phasing terms given in FIG. 8A or FIG. 8B. Alternatively we can also choose the co-phasing terms given in FIG. 9 or FIG. 10.

The rank-3 and rank-4 codebooks can be fixed to the legacy (Householder) rank-3 and rank-4 codebooks. We note that all codeword matrices in the aforementioned codebook satisfy the constant magnitude property.

IV. Example 4

Another related issue arises when a user is configured to use the legacy 4 TX codebook in one of its CSI processes and where that process (or equivalently the mode defined for that CSI process) requires the user to report per-subband precoding matrices. Here, when the user's preferred rank is 3 or 4, then the size of the legacy codebook (4 bits for both ranks 3 and 4) might be an overkill for per-subband reporting. In other words, the feedback can be reduced without any noticeable impact on performance since such a user is experiencing good average SINR and will typically be scheduled alone on its assigned resources. To achieve feedback reduction the network can define sub-sampled versions of legacy codebooks for ranks 3 and 4 and configure the user to report codewords from these sub-sampled codebooks when its preferred rank is 3 or 4. The sub-sampled rank-3 codebook is obtained by removing one or more codewords from the rank-3 legacy codebook whereas by removing one or more codewords from the rank-4 legacy codebook the sub-sampled rank-4 codebook is obtained. These sub-sampled codebooks are defined by the network and conveyed in advance to all users. Another approach which offers more flexibility is to leverage codebook subset restriction. Here, suppose that the size (per-subband) of the rank-3 codebook is limited to M codewords. Then, the network can determine a subset (in a semi-static and possibly user-specific manner) containing no more than M codewords from the legacy rank-3 codebook and convey this subset to the user. The user then restricts its search (for rank-3 codewords) to this subset on each subband. To report its preferred codeword on each subband, the user adopts lexicographic ordering (labelling), i.e., the codeword in the indicated subset having the smallest index (as in the original rank-3 legacy codebook) is assigned a new index of one, the codeword in the indicated subset having the second smallest index (as in the original rank-3 legacy codebook) is assigned a new index of two. This process continues till all codewords in the subset have been assigned new indices. Clearly the new indices will span from 1 to M' where M'≤M. Also note that since the subset is common across all subbands, the set of new indices is also common across all subbands and hence must be determined by the user once. The user then reports the new index of its selected precoder on each subband. The same procedure can be applied for rank-4 as well where we note that the value of M can be different for rank 4 and rank 3.

Finally, to improve MU-MIMO performance, additional feedback can be incorporated for a CSI process (or equivalently the mode defined for that CSI process). As detailed in our previous work [8], the user can also report MU-CQI(s) along with its Single-user (SU) channel state information (CSI) report. This SU-CSI (comprising of wideband or per-subband PMI, and per-subband CQI) is computed using the pilots and resource elements for interference measurement that are configured for that CSI process. Several ways to compute these MU-CQI(s) were detailed in our previous work [9], one of which involved the user using the PMI(s) determined in its SU-CSI report or determined using SU-MIMO rules (referred to below as base-PMI(s)) to compute MU-CQI(s), after assuming (or emulating) a set of co-scheduled interferers (on a subband basis if so configured). Here the set of co-scheduled interfering PMIs (i.e., transmit precoders assigned to the co-scheduled other users) that the user assumes on a subband is a function of a base-PMI it has determined. Each set of co-scheduled interfering PMIs that the user must assume can be configured by the network in a semi-static (and possibly user-specific) manner. The size of the set interfering PMIs (for each choice of base-PMI) can be greater than one. To reduce overhead, the resulting MU-CQI(s) computed on a subband basis can be combined into one or (or at-most two) wideband MU-CQI(s) (as detailed in our work [10] on wideband residual error norm feedback) which are then reported. To further improve performance, multiple such sets of interfering PMIs (for each base-PMI) can be configured. Then the user reports one (or at-most two) wideband MU-CQI(s) for each configured set of interfering PMIs and differential feedback can be leveraged to reduce the feedback overhead. Alternatively, the process described above can be repeated for several choices of base-PMIs and the user can choose one particular base-PMI (using an appropriate selection rule such as the one maximing an expected MU gain) and report it along with the associated MU-CQI(s).

We return to the codebook construction in the following.

Codebook Construction in Product Form

We first present a generic codebook construction in which each codeword is derived as a matrix product. Letting $w_n = [1 \; \exp(j2\pi n/N)]^T$ for $n = 0, \ldots, N-1$ denote the 2×1 beam vector, we define the inner (wideband) codebook as $$C^{(1)} = \left\{ \begin{bmatrix} A(q)W^{(1)}(k) & 0 \\ 0 & A(q)W^{(1)}(k) \end{bmatrix} : W^{(1)}(k) = [ \right. \tag{4-1}$$

$$w_{a_k \bmod N}, w_{(a_k+1) \bmod N}, \ldots, w_{(a_k+J-1) \bmod N}],$$

$$\left. k = 0, \ldots, L-1; q = 1, \ldots, Q \right\},$$

where $\{a_k\}$ are real valued scalars and $$A(q) = \begin{bmatrix} 1 & 0 \\ 0 & \exp(j2\pi d_q) \end{bmatrix},$$

$$q = 1, \ldots, Q,$$

where $d_q \in [0,1] \forall q$. Note that the (angular) separation between the phase terms in any two adjacent beam vectors within a particular inner codeword $A(q)W^{(1)}(k)$ is $2\pi/N$ so that N (which is referred to as granularity) and J (which is equal to the number of beam vectors per inner codeword) together determine the angular span of the phase terms in each inner codeword. Intuitively, a larger angular span (which can be achieved by having a smaller N (i.e., lower granularity or a larger $2\pi/N$) for a given J, or a larger J for a given N) would allow us to make the codebook suitable even for less correlated fading scenarios and would also provide robustness against timing alignment errors. However, the cost of increasing J is a larger size of each outer sub-band codebook whereas choosing a smaller N can degrade performance in closely spaced cross-pole configuration since it hinders localization of beam vectors in a given inner codeword. On the other hand, the scalars $\{d_q\}$ (referred to as staggering factors) help control the separation between the phase terms in any two beam vectors that belong with two inner codewords $A(q)W^{(1)}(k)$ and $A(q')W^{(1)}(k)$ for some $q, q' \in \{1, \ldots, Q\}$. Intuitively, a small such separation would be beneficial for exploiting correlation in time and frequency.

An extension to the inner codebook described above is to use two (or more) sets of granularities, where each granularity can have its own set of staggering factors. This would typically increase the size of the wideband codebook but can better cater to different antenna configurations. We describe next such a composite inner (wideband) codebook for I different choices of granularities, as $$C^{(1)} = \left\{ \begin{bmatrix} A(q)W^{(1)}(k) & 0 \\ 0 & A(q)W^{(1)}(k) \end{bmatrix} : W^{(1)}(k) = [w_{a_k \bmod N_i}, \right.$$

$$\left. w_{(a_k+1) \bmod N_i}, \ldots, w_{(a_k+J-1) \bmod N_i}], k \in \mathcal{K}_i \& q \in Q_i, i = 1, \ldots, I \right\},$$

where $\mathcal{K}$ and $Q_i$ are sets of indices associated with the $i^{th}$ granularity $N_i$. Note that J remains fixed across different granularities. In certain scenarios (with very low correlation) it might be advantageous to choose at-least one of the granularities such that two or more of the beamvectors in many of its associated inner codewords are mutually orthogonal.

The rank-1 outer (subband) codebook is then defined as $$C_1^{(2)} = \left\{ \begin{bmatrix} e_i \\ \exp(j\theta_{s,i})e_i \end{bmatrix} \right\},$$
$$s = 1, \ldots, S,$$
$$i = 1, \ldots, J$$

where $e_i$ denotes the $i^{th}$ $j \times 1$ column selection vector (i.e., the $i^{th}$ column of the J×J identity matrix) and $\exp(j\theta_{s,i})$ is a co-phasing term. The (maximum) size of the Rank-1 codebook is thus JS. A smaller size can be obtained by selecting only a subset of all possible such vectors. The co-phasing terms can be obtained by optimizing a suitable metric such as the average Chordal distance after restricting them to lie in an M-PSK alphabet where the positive integer M≥1 is a design parameter. The optimization can be constrained to ensure that a minimum angular separation is maintained between the co-phasing terms. For rank-2, the outer (subband) codebook is defined as $$C_2^{(2)} = \left\{ \begin{bmatrix} e_m & e_p \\ \exp(j\theta_{s,m,p})e_m & -\exp(j\theta_{s,m,p})e_p \end{bmatrix} \right\}.$$

Note that for different pairs (m, p) and (m', p') we can have different number of co-phasing terms. The co-phasing terms can be obtained by optimizing a suitable metric such as the average Chordal distance after restricting them to lie in an M'-PSK alphabet where the positive integer M'≥1 is a design parameter and can be different from M. The optimization can be constrained to ensure that a minimum angular separation is maintained between the co-phasing terms.

Thus, (1) we identified the key structure that each eigenvector of the spatial correlation matrix under the ULA transmit antenna configuration must have and the key structure that each eigenvector of the spatial correlation matrix under the cross pole transmit antenna configuration must have. (2) We then enforced the identified structures on at-least one subset of the precoding codebook to ensure good performance. (3) We also presented embodiments that respect the identified structures and are also efficient.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

What is claimed is:

1. A method implemented in a base station used in a wireless communications system, the method comprising:
   having 1-layer, 2-layer, 3-layer, and 4-layer codebooks for 4 transmit antenna (4TX) transmission, each codebook including a plurality of precoding matrices;
   precoding data with one of the plurality of precoding matrices; and
   transmitting, from four transmit antennas of the base station to a user equipment, the precoded data,
   wherein the 1-layer codebook comprises a first 1-layer codebook and a second 1-layer codebook each of which includes a plurality of 4×1 precoding matrices, and the 2-layer codebook comprises a first 2-layer codebook and a second 2-layer codebook each of which includes a plurality of 4×2 precoding matrices, and
   wherein each precoding matrix in the first 1-layer and 2-layer codebooks comprises a first index and a second index.

2. The method as in claim 1, wherein the first index is for a plurality of subbands and the second index is for each subband.

3. The method as in claim 1, wherein each of the second 1-layer and 2-layer codebooks comprises a legacy codebook or a householder codebook.

4. The method as in claim 1, wherein each of the 3-layer and 4-layer codebooks comprises a legacy codebook or a householder codebook.

5. The method as in claim 1, wherein each precoding matrix W in the first 1-layer and 2-layer codebooks satisfies $W = W^{(1)} W^{(2)}$, where first matrix $W^{(1)}$ is chosen from inner codebook $C^{(1)}$, and second matrix $W^{(2)}$ is chosen from an outer codebook.

6. A wireless communications system comprising:
   a base station having 1-layer, 2-layer, 3-layer, and 4-layer codebooks for 4 transmit antenna (4TX) transmission, each codebook including a plurality of precoding matrices and precoding data with one of the plurality of precoding matrices;
   a user equipment receiving, from four transmit antennas of the base station, the precoded data,
   wherein the 1-layer codebook comprises a first 1-layer codebook and a second 1-layer codebook each of which includes a plurality of 4×1 precoding matrices, and the 2-layer codebook comprises a first 2-layer codebook and a second 2-layer codebook each of which includes a plurality of 4×2 precoding matrices, and
   wherein each precoding matrix in the first 1-layer and 2-layer codebooks comprises a first index and a second index.

7. A method implemented in a wireless communications system, the method comprising:
   having 1-layer, 2-layer, 3-layer, and 4-layer codebooks for 4 transmit antenna (4TX) transmission, each codebook including a plurality of precoding matrices;
   precoding data with one of the plurality of precoding matrices; and
   transmitting, from four transmit antennas of a base station to a user equipment, the precoded data,
   wherein the 1-layer codebook comprises a first 1-layer codebook and a second 1-layer codebook each of which includes a plurality of 4×1 precoding matrices, and the 2-layer codebook comprises a first 2-layer codebook and a second 2-layer codebook each of which includes a plurality of 4×2 precoding matrices, and
   wherein each precoding matrix in the first 1-layer and 2-layer codebooks comprises a first index and a second index.

8. The method as in claim 7, wherein the first index is for a plurality of subbands and the second index is for each subband.

9. The method as in claim 7, wherein each of the second 1-layer and 2-layer codebooks comprises a legacy codebook or a householder codebook.

10. The method as in claim 7, wherein each of the 3-layer and 4-layer codebooks comprises a legacy codebook or a householder codebook.

11. The method as in claim 7, wherein each precoding matrix W in the first 1-layer and 2-layer codebooks satisfies $W=W^{(1)}W^{(2)}$, where first matrix $W^{(1)}$ is chosen from inner codebook $C^{(1)}$, and second matrix $W^{(2)}$ is chosen from an outer codebook.

* * * * *